(12) United States Patent
Raynor (10) Patent No.: US 8,279,306 B2
(45) Date of Patent: Oct. 2, 2012

(54) IMAGE SENSOR NOISE REDUCTION

(75) Inventor: Jeffrey M. Raynor, Edinburgh (GB)

(73) Assignee: STMicroelectronics (R&D) Ltd., Marlow, Buckinghamshire (GB)

( * ) Notice: Subject to any disclaimer, the term of this patent is extended or adjusted under 35 U.S.C. 154(b) by 891 days.

(21) Appl. No.: 11/966,001

(22) Filed: Dec. 28, 2007

(65) Prior Publication Data

US 2008/0170136 A1     Jul. 17, 2008

(30) Foreign Application Priority Data

Jan. 2, 2007 (EP) .................................. 07100007

(51) Int. Cl.
    *H04N 5/235* (2006.01)
    *H04N 3/14* (2006.01)
(52) U.S. Cl. .................................. 348/230.1; 348/297
(58) Field of Classification Search ............... 348/208.1, 348/230.1, 241, 302, 308, 45, 296, 297, 229.1, 348/362, 366
    See application file for complete search history.

(56) References Cited

U.S. PATENT DOCUMENTS

| | | | |
|---|---|---|---|
| 6,614,477 B1* | 9/2003 | Lee et al. ...................... | 348/312 |
| 2004/0073087 A1* | 4/2004 | Glukhovsky et al. ......... | 600/109 |
| 2004/0141074 A1 | 7/2004 | Milkov et al. | |
| 2005/0023356 A1* | 2/2005 | Wiklof et al. ............. | 235/462.42 |
| 2005/0046701 A1* | 3/2005 | Kaneko et al. ............. | 348/222.1 |
| 2005/0078205 A1 | 4/2005 | Hynecek | |
| 2006/0164533 A1* | 7/2006 | Hsieh et al. ................... | 348/317 |
| 2006/0226231 A1* | 10/2006 | Johnston et al. ......... | 235/462.45 |
| 2007/0203413 A1* | 8/2007 | Frangioni ..................... | 600/478 |
| 2007/0288973 A1* | 12/2007 | Glatron et al. ................ | 725/105 |

OTHER PUBLICATIONS

European Search Report and written opinion, EP 07 10 0007, dated Jun. 1, 2007.

* cited by examiner

*Primary Examiner* — Trung Diep (74) *Attorney, Agent, or Firm* — Gardere Wynne Sewell LLP (57) ABSTRACT

An imaging system includes a plurality of pixels. A pixel readout circuit produces a plurality of first image frames from those pixels. An image output circuit produces a plurality of second image frames and operates to produce a second image frame from more than one of the first image frames. The pixel readout circuit is enabled to produce the first images frames at a rate faster than the image output circuit produces the second image frames. Through combining first image frames, by averaging or other statistical combinations, the photon shot noise of second image frames is reduced. Photon shot noise affects images with high light levels more than those with low light levels and, as such, the system processing alters the rate of first image frames dependent on the current light levels.

22 Claims, 7 Drawing Sheets

IMAGE SENSOR NOISE REDUCTION

PRIORITY CLAIM

The present application claims priority from European Application for Patent No. 07100007.9 of the same title filed Jan. 2, 2007, the disclosure of which is hereby incorporated by reference.

BACKGROUND

1. Technical Field of the Invention

The present invention relates to image sensor noise reduction and particularly, but not exclusively, to reduction of photon shot noise in image sensors without increasing image sensor size.

2. Description of Related Art

Image sensors are typically constructed of a matrix of pixels. Unwanted variations in pixel output, or noise, is a significant problem in image sensors. There are many noise sources and the dominating factor depends on the particular situation.

For low light levels, the noise in dark scenes is important and is typically cause by one of dark current (leakage through the photodiode and its variations); readout noise (thermal noise of the transistors); and reset noise, also known as kTC noise, which comes from uncertainties in resetting the capacitance on the photodiode.

For high light levels, photon shot noise dominates the noise sources. Photon shot noise results from natural fluctuations in the number of photons detected by a pixel: a photon separates electrons from atoms and is therefore "detected" by collecting electrons which have been separated. The randomness in the number of photons detected is manifested as a temporal and spatial fluctuation in the signal produced by the pixel. Photon shot noise occurs even with an ideal noise-free pixel. Thus, photon shot noise imposes a fundamental limit on the responsiveness of a pixel insofar as it determines the minimum noise level achievable.

Photon shot noise is described by the square root of the number of photons hitting a pixel per unit time (or in other words, the square root of the intensity or flux (F) of incident radiation). Therefore increasing flux density (F) reduces the relative fraction of photon shot noise.

The full well capacity of a pixel refers to the total amount of electrons or charge that can be stored in the pixel before overflowing into an adjoining pixel. Since this feature is a result of the pixel value being stored on a capacitor, which is in turn dependent on pixel area, the full well capacity of a pixel is dependent among other things upon its physical size.

As such, the full well capacity of a pixel provides an upper limit on the number of photons that can be integrated. Thus, any attempt to increase the flux density of the radiation incident on a pixel and the detection thereof must be accompanied by an increase in the full well capacity of the pixel.

Typically, for a well designed, modern, high resolution camera, with a 10 bit ADC (Analog to Digital Converter), the noise sources from low light combined is around 0.5-1 ADC units, while the photon shot noise is 8 ADC units.

Unfortunately, the commercial pressure is to reduce pixel size as this either reduces the size of the device, which is important for size-critical applications such as mobile phones, laptop PCs, PDAs and the like, or increased pixel count. Reducing the size of the pixel, reduces the capacitances and hence the full well capacity also reduced, thereby increasing the noise.

For high quality images in average or good lighting systems, the photon shot noise dominates and hence techniques and methods to reduce this are advantageous.

Reducing the photon shot noise usually involves increasing the pixel's full-well capacity. There are several known techniques: increasing the pixel capacitance, often by increasing the size of the pixel (but thereby increasing the size and/or cost of the sensor; increasing the pixel's voltage swing, usually through special manufacturing process (even though modern CMOS sensors are made using an optimized process, full-well capacity is often limited to 10 k$\overline{e}$ to 20 k$\overline{e}$); or special architecture of the pixel, for example "photon counting". The trouble with these techniques is that, due to the pixel complexity, they are only suitable for larger (20 μm) pixel sizes and not for smaller (<3 μm). That is, the associated circuitry required cannot be arranged within the dimensions of a smaller size pixel.

It is well known that one method to reduce noise in an image is to average several pixels together. Often this is done spatially, in fact many commercial image sensors have high photon shot noise but their resolution (e.g. 3 Mpix-10 Mpix) is much higher than the resolution of the display (screen, projector etc.), so they are "zoomed", or resealed, to fit which involves averaging pixels together. However, if the image is cropped, examined at its native resolution or requires the full resolution of the sensor, the photon shot noise is readily apparent.

Some image sensors provide on-chip scaling—this can be done at the digital level or even at the pixel level (also known as "analog binning").

Another method of averaging is temporal averaging. Here several images are acquired, stored and averaged on a per-pixel basis. This maintains the full spatial resolution, but allows for a reduction in noise.

In prior art temporal averaging systems, an image sensor produces image frames at the same rate as the frames are outputted. For example, PAL (phase-alternating line) is a 50 Hz interlaced system with 625 lines, the image sensor in a PAL system produces 50½ vertical resolution images per second (often called a "field") and these are displayed on a PAL output display, such as a television. These techniques can work at any frame/field rate, for example: 25 Hz, 29.97 Hz, 60 Hz, 59.94 Hz, 100 Hz, 120 Hz, etc.

There are various de-interlacing systems which combine the output, with or without averaging, of two 50 Hz fields (½ vertical resolution) into a single frame (full vertical resolution) at either 50 Hz or 25 Hz rate. However, de-interlacing systems by definition have to interpolate in one manner or another as each field is distinct either spatially or temporally.

For high definition systems, for example 50 Hz/720 p, the sensor produces 50 full (720 lines) images per second and the transmission and display is also 50 images per second, each image having 720 lines of information. As such, no averaging is performed between frames.

There is accordingly a need in the art for an improved manner of reducing image sensor noise.

SUMMARY

According to a first aspect, there is provided an image sensor comprising: a plurality of pixels; a pixel readout circuit for producing a plurality of first image frames; a image output circuit for producing a plurality of second image frames and operable to produce a second image frame from more than one of the first image frames, wherein the pixel readout circuit is enabled to produce the first images frames at a rate faster than the image output circuit produces the second image frames.

The image output circuit is operable to perform a statistical combination of more than one of the first image frames to produce a second image frame.

The statistical combination is averaging of the respective pixel values of more than one of the first image frames.

The image sensor further comprises an exposure monitoring circuit for monitoring exposure of the plurality of pixels by receiving data relating to pixel values.

If a predetermined number of pixels have a pixel value below a predetermined level, the exposure monitoring circuit is enabled to provide a signal such that the pixel readout circuit reduces the rate at which the first image frames are produced.

If a predetermined number of pixels have a pixel value above a predetermined level, the exposure monitoring circuit is enabled to provide a signal such that the pixel readout circuit increases the rate at which the first image frames are produced.

The imaging system further comprises a circuit for altering the pixel readout circuit clock frequency, and the pixel readout circuit clock frequency is altered in accordance with signals received from the exposure monitoring circuit.

The image output circuit produces a second image frame from one or more first images frames which have been fully readout from the pixel readout circuit before the end of the second image frame.

The first images frames are produced at a rate equal to an integer multiple X of the rate of the second image frames.

A second image frame M, of the second image frames, is produced from the first image frames N to N+(X−1) and production of frame M is begun once information from N+1 is available.

In an implementation, X is 2.

A second image frame M, of the second image frames, is produced from the first image frames N and N+1 and production of frame M is begun once information from N+1 is available.

Alternatively, a second image frame M, of the second image frames, is produced from the first image frames N-Y to N+(X−1), the first fraction 1/X of frame M being produced from N-Y to N−(Y+(Z−1)), where Z is the number of frames to included in each fraction, the subsequent fraction being produced from N−(Y+1) and N−(Y+Z), and the pattern continuing up to N+(X−Z) and N+(X−1).

In an implementation, X is 2, Y is 1 and Z is 2.

Alternatively, X is 4, Y is 1 and Z is 4.

Alternatively, the first images frames are produced at a rate equal to a non-integer multiple "X" of the rate of the second image frames.

The image output circuit produces second image frames from a predetermined number of first image frames which have already been produced by the pixel readout circuit.

The predetermined number of first image frames is two.

According to a second aspect, there is provided an endoscope apparatus comprising an image sensor according to the first aspect.

According to a third aspect, there is provided a video imaging system comprising an image sensor according to the first aspect.

The image output circuit of the video system operates at 50 Hz.

Alternatively, the image output circuit of the video system operates at 60 Hz.

In an embodiment, a method comprises: reading out a plurality of first image frames from a plurality of pixels; producing a plurality of second image frames wherein each second image frame is produced from more than one of the first image frames; and wherein reading out comprises producing the first images frames at a rate faster than the second image frames are produced.

BRIEF DESCRIPTION OF THE DRAWINGS

An embodiment of the invention will now be described by way of example only with reference to the accompanying Figures in which.

DETAILED DESCRIPTION OF THE DRAWINGS

The word "frame" is used in this description to represent data representing an image forming part of a video stream and should be construed to also cover a field, in respect of interlaced video streams, as the same principles apply.

As discussed above, the dominating noise source in an image sensor is, typically, "photon shot noise", which is limited by the number of electrons each pixel can store. The method and system proposed herein effectively increases the number of electrons each pixel can store by allowing the sensor to operate at a faster frame rate (or field rate if it is interlaced) than the output frame (field) rate.

For example, a 2 μm pixel has a storage capacitance of around 1.6 fF and with a 1V swing, each pixel will store up to 10,000 electrons per frame. The photon shot noise is the square root of the number of photons, which we equate to the number of electrons stored. Therefore, the SNR (signal to noise ratio) is 100:1. If two readings from the pixel were used to produce a single image, then there will be up to 20,000 electrons per pixel per frame stored and therefore the SNR will be approximately 141:1.

Figure 1:
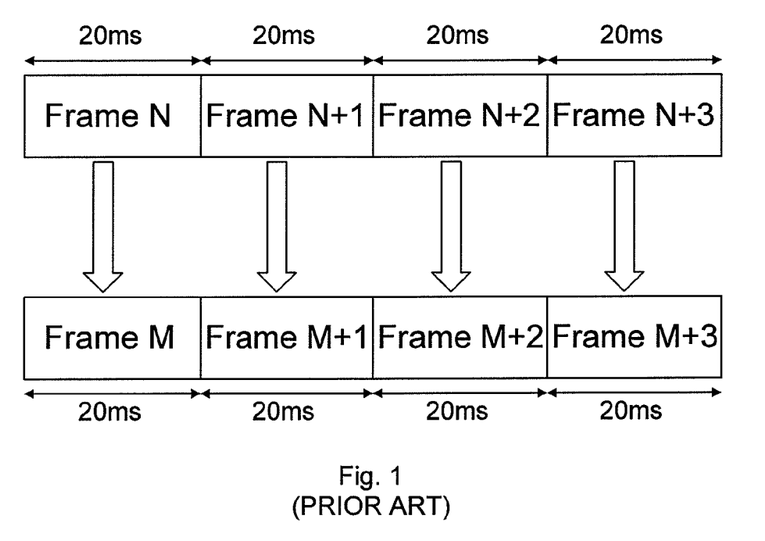
FIG. 1 illustrates a prior art relationship between pixel readout rate and image readout rate.
Figure 2:
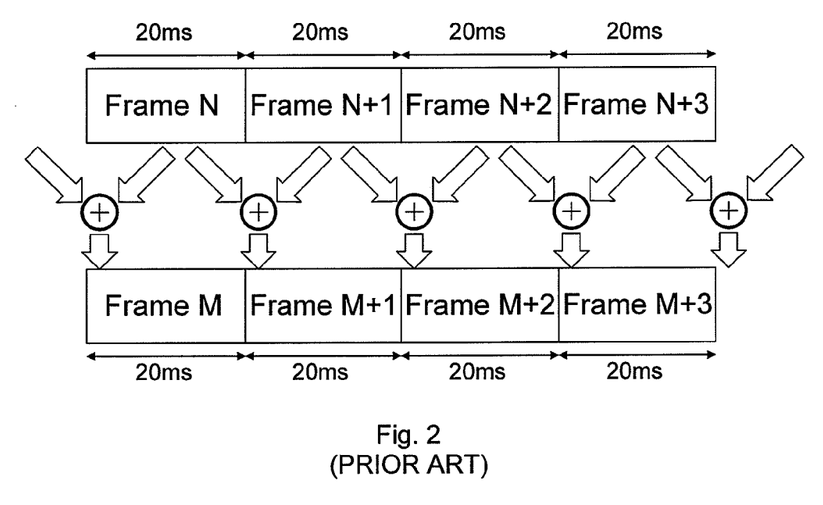
FIG. 2 illustrates a prior art relationship between pixel readout rate and image readout rate using an image averaging technique.
Figure 3:
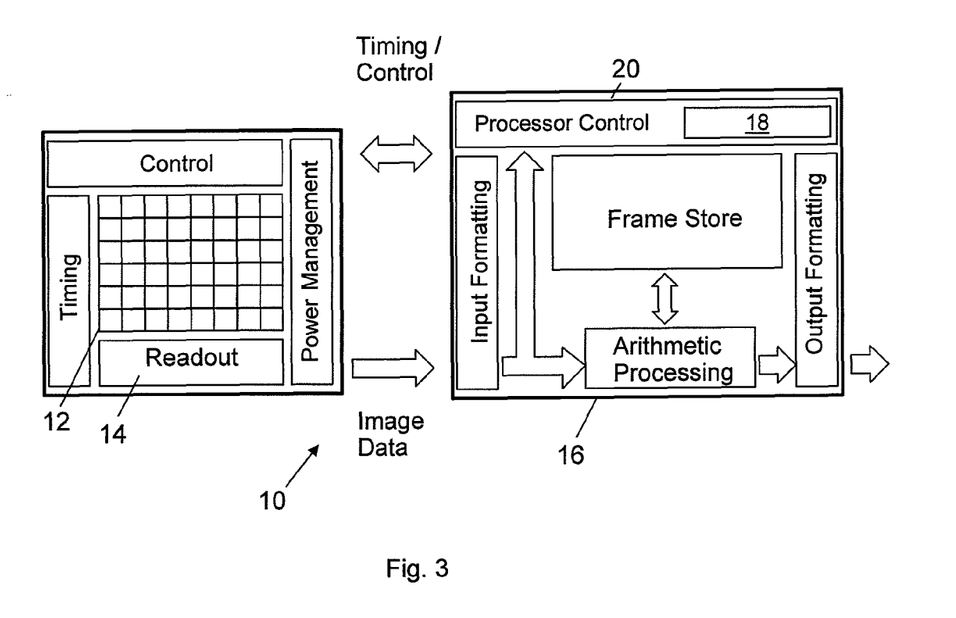
FIG. 3 illustrates an image sensor having a pixel array and pixel readout circuit and separate image output circuit.

Referring to FIG. 3, an image sensor 10 comprises, amongst other things, a pixel array 12, a pixel readout circuit 14 and an image output circuit 16.

Figure 4:
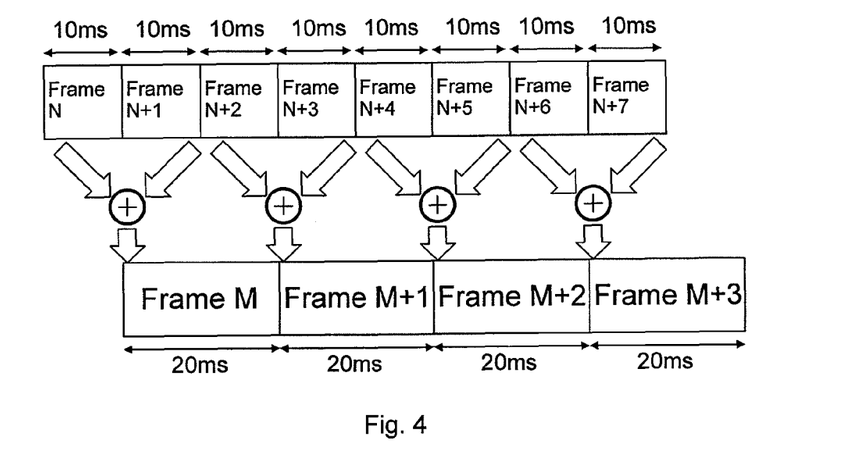
FIG. 4 illustrates first images frames from a pixel readout circuit being readout at a faster rate than that of second image frames from an image output circuit.

Referring now to FIG. 4, a series of first image frames N, N+1, N+2, . . . from the pixel array 12 are shown along with a series of second image frames M, M+1, M+2, representing the output of the image output circuit 16. In this example, the first image frames are captured at a rate of 1 every 10 ms or 100 Hz and the second images frames are produced at a rate of 1 every 20 ms or 50 Hz.

For each of the series of second image frames M, M+1, M+2, . . . , two of the series of first image frames N, N+1, N+2, . . . are used to generate the second image frame. For example, frame N and N+1 are combined to produce frame M and frame N+2 and N+3 are combined to produce frame M+1.

This can be generalized to each second image frame M being produced from the first image frames N to N+(X−1) and production of frame M begins once information from N+1 is available, where X is the rate that the first images frames are produced relative to the rate of the second image frames.

The corresponding pixel values in, for example, N and N+1 can be combined by simple addition or averaging. Although, it can also be envisaged that other statistical methods of combination could be used depending on the intended output.

It is not possible to start the output of frame M until pixel values from both N and N+1 are available. As such, in FIG. 4, there a 10 ms delay from the end of from N+1 to the output of frame M and 20 ms from the end of from N the output of frame M. This delay may be of concern in various applications, for example if the imaging system is used by a human to control manipulations of objects (e.g., an endoscope used by a surgeon).

Figure 5:
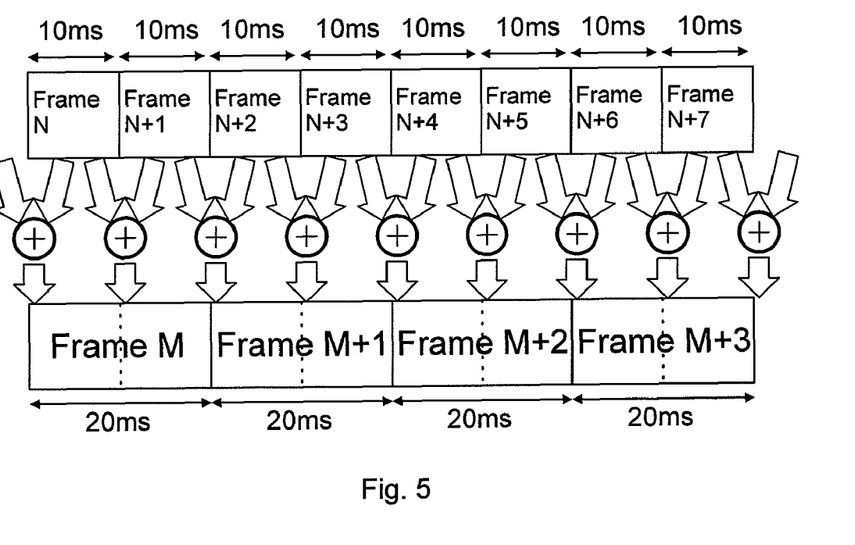
FIG. 5 illustrates first images frames from a pixel readout circuit being readout at a faster rate than that of second image frames from an image output circuit, with smaller delay for output of the second image frames.

In FIG. 5, there is a 2:1 ratio between a series of first image frames N, N+1, N+2, . . . from the pixel array and a series of second image frames M, M+1, M+2, . . . representing the output of the image stream, but a second image frame is produced from three of the first image frames. The operation can be best described by examining the composition of output frame M+1 in FIG. 5. The first half of frame M+1 is formed by averaging frames N+1 and N+2, the last half of frame M+1 is formed by averaging frames N+2 and N+3. The longest delay is now produced by 10 ms delay from end of sensor frame N+2 and ~0 delay from sensor frame N+3. This is significantly better than that described in FIG. 4, but requires a more complex processing system.

Figure 6:
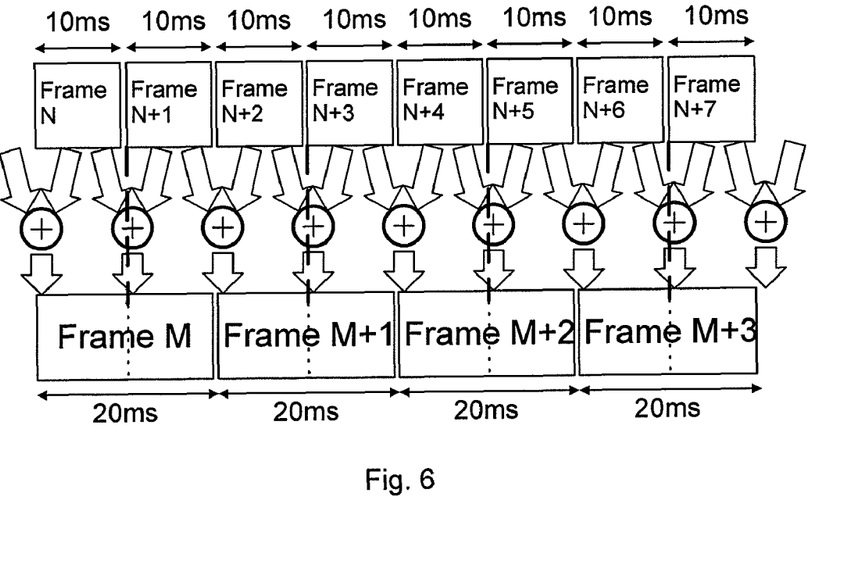
FIG. 6 illustrates the same first and second image frames of FIG. 5 with a more accurate graphical representation of the associated timing artifacts after deconvolution of a high contrast circular target with cubic and petal phase masks.

For simplicity of illustration, the examples of FIG. 4 and FIG. 5 show a continuous, unbroken, series of first and second image frames. In practice, as graphically shown in FIG. 6, which is otherwise identical to FIG. 5, there will often be a short pause in the data stream, to allow, for example, vertical synchronization. This does not affect the principle of the technique, but rather reflects the practicalities of implementation and the resultant adjustment to the point at which the switch-over from combining the first image frames takes place, as it is not possible to process data from first image frames that has not been output from the pixel array.

Figure 7:
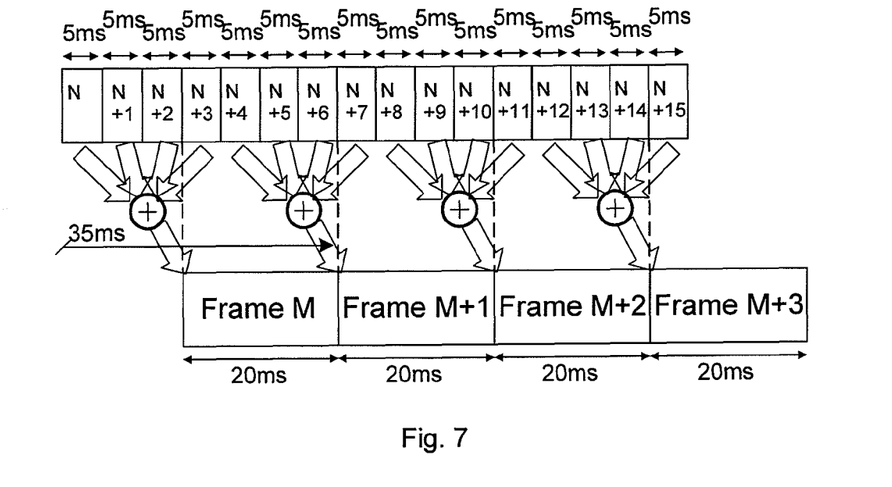
FIG. 7 illustrates first images frames from a pixel readout circuit being readout four times faster than that of second image frames from an image output circuit.

The previous examples show that the pixel readout circuit 14 of the pixel array 12 is operating at a rate two times faster than the actual image output circuit 16 output rate. Clearly, this technique can be extended to further increase the pixel's effective full well capacity by operating the pixel readout circuit at a yet faster rate than the image output circuit. For example, three times, four times or more could be used to further reduce the photon shot noise. Referring to FIG. 7, an example is shown where the pixel readout circuit is producing first image frames at a rate four time faster than the output image circuit is producing second image frames. In this example, four of the first image frames are combined to produce the second image frame. The lag associated with producing second images frames, in this example, is therefore 35 ms.

Figure 8:
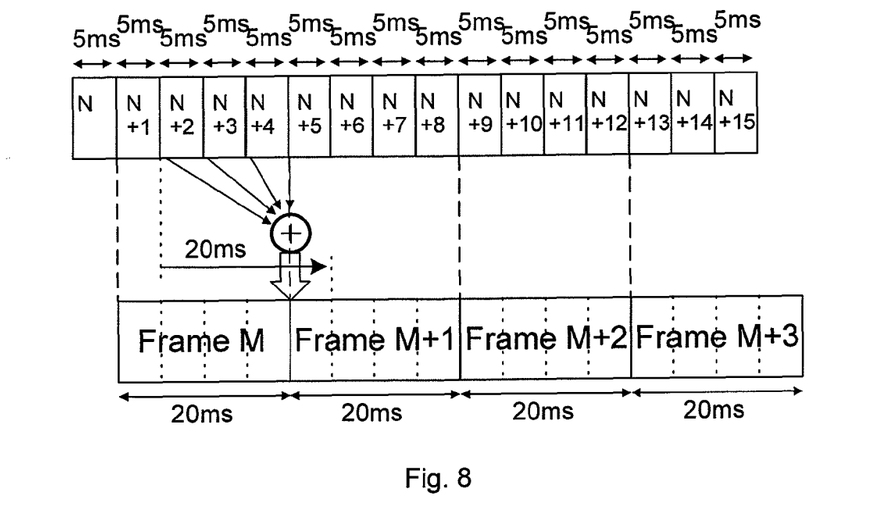
FIG. 8 illustrates first images frames from a pixel readout circuit being readout four times faster than that of second image frames from an image output circuit, with a combination of the first image frames being used to produce the first quarter of a second image frame.
Figure 9:
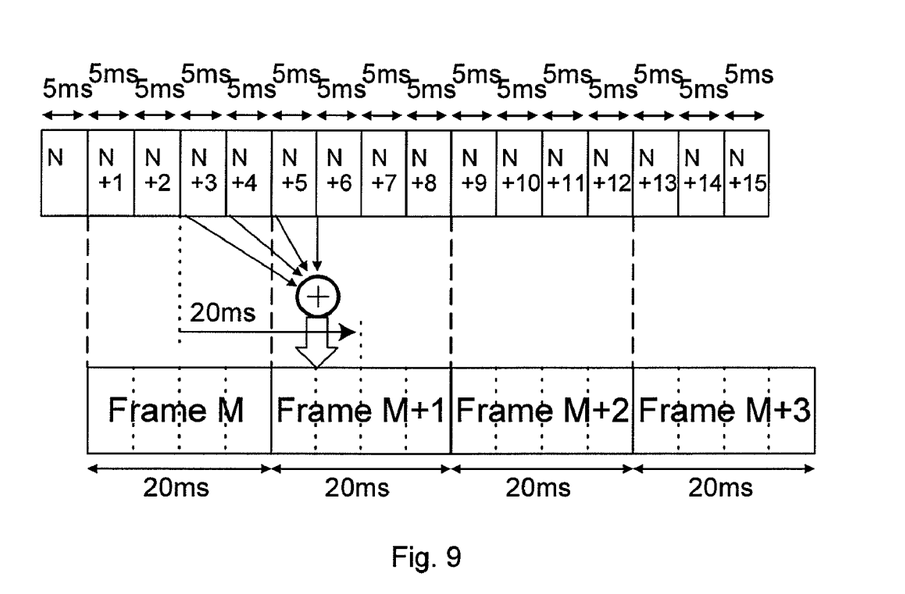
FIG. 9 illustrates first images frames from a pixel readout circuit being readout four times faster than that of second image frames from an image output circuit, with a combination of the first image frames being used to produce the second quarter of a second image frame.

FIG. 8 also shows an example where the pixel readout circuit is producing first image frames at a rate four time faster than the output image circuit is producing second image frames. In this instance, the second image frame is combined in quarters from four of the first image frames. That is, the first quarter of the second image frame M+1 is produced from a combination of the relevant pixel values of the first image frames N+2 to N+5, as shown in FIG. 8 and the second quarter is produced from a combination of the relevant pixel values of the first image frames N+3 to N+6, as shown in FIG. 9. The third quarter would be produced from a combination of the relevant pixel values of the first image frames N+4 to N+7; and the fourth quarter would be produced from a combination of the relevant pixel values of the first image frames N+5 to N+8. The lag associated with producing second images frames, in this example, is therefore 20 ms, providing an improvement of 15 ms but resulting in greater complexity in combining the first image frames to arrive at the second image frames.

It is possibly to generalize the case in which the first image frames are produced at a rate which is an integer multiple of the second image frames and where fractions of the second image are produced from different frames of the first image frames. That is, a second image frame M is produced from the first image frames N-Y to N+(X−1), the first fraction 1/X of frame M being produced from N-Y to N−(Y+(Z−1)), where X is the rate at which first image frames are produced relative to the second image frames, Y is the number of first image frames previous to first image frame N to be included in producing the first fraction 1/X of frame M and Z is the number of frames to be included in each fraction. That is, the subsequent fraction, being produced from N−(Y+1) and N−(Y+Z), and the pattern continuing up to N+(X−Z) and N+(X−1).

Figure 10:
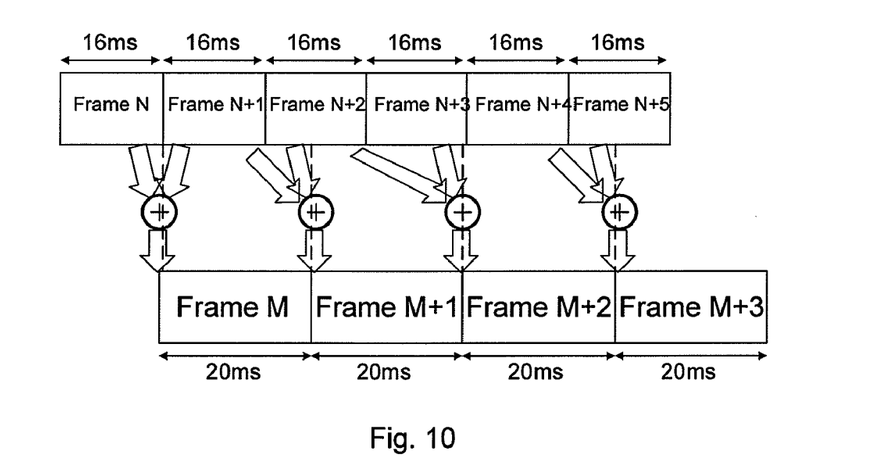
FIG. 10 illustrates first images frames from a pixel readout circuit being readout one and a half times faster than that of second image frames from an image output circuit.

It is not necessary to have an integer relationship between rate of the pixel readout circuit 14 and the rate of the image output circuit 16. For example, FIG. 10 shows an example where the pixel readout circuit is producing first image frames at a rate 1.5 times faster than the output image circuit is producing second image frames. In this example, each second image frame M, M+1, M+2, . . . is produced from the two completed first image frames, that is, they have been completely readout by the pixel readout circuit, immediately proceeding the start of the second image frame. As such, the second image frame M is produced from the first images frames N and N+1.

It should be noted that having an integer relationship both prevents and minimizes motion artifacts and also simplifies the processing.

The maximum frame rate will be determined by the maximum rate at which the pixel array 12 can output data.

The foregoing processing technique increases a pixel's full-well capacity, but it also may reduce the pixel's sensitivity to light.

For example, in CMOS (Complementary Metal-Oxide Semiconductor) image sensors, the maximum integration time is one (readout) frame. The readout process is "destructive", that is, once the charge is readout, it is no longer available for further integration, as the pixel is reset. Hence, by increasing the frame rate and reducing the maximum integration time, the system is less sensitive to light.

Figure 11:
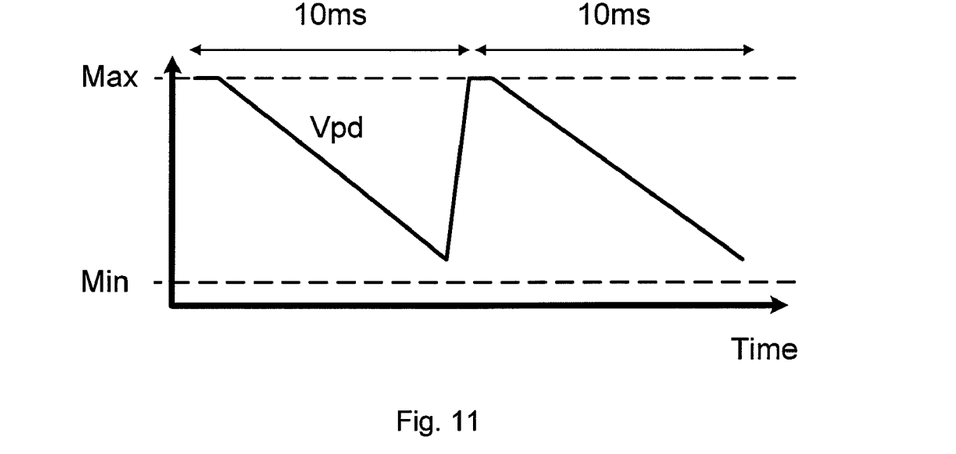
FIG. 11 illustrates a graph of voltage versus time for two 10 ms integration periods for high light levels.

Referring now to FIG. 11, a pixel's photodiode voltage swing (Vpd) is shown when operating according to the techniques disclosed herein. In this example, the sensor's read time, or integration time, is 10 ms, whereas the image output circuit output rate is 20 ms, that is, two first image frames give one second image frame. There is a large slew rate (voltage change with respect to time or dV/dt) on Vpd, as there is high light levels. If 20 ms had been used as the integration time, clearly, the pixel would have saturated. FIG. 11 shows that the pixel has not saturated, as Vpd does not go below "Min". As photon-generated electrons are collected from both 10 ms integration periods, there is therefore a higher number of collected electrons than if a single integration period was used, which illustrates the advantage of the disclosed techniques.

Figure 12:
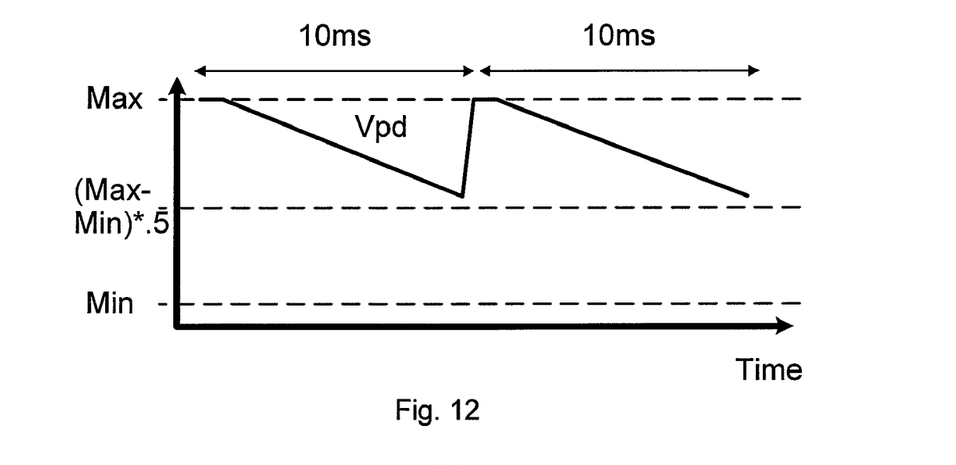
FIG. 12 illustrates a graph of voltage versus time for two 10 ms integration periods for lower light levels.
Figure 13:
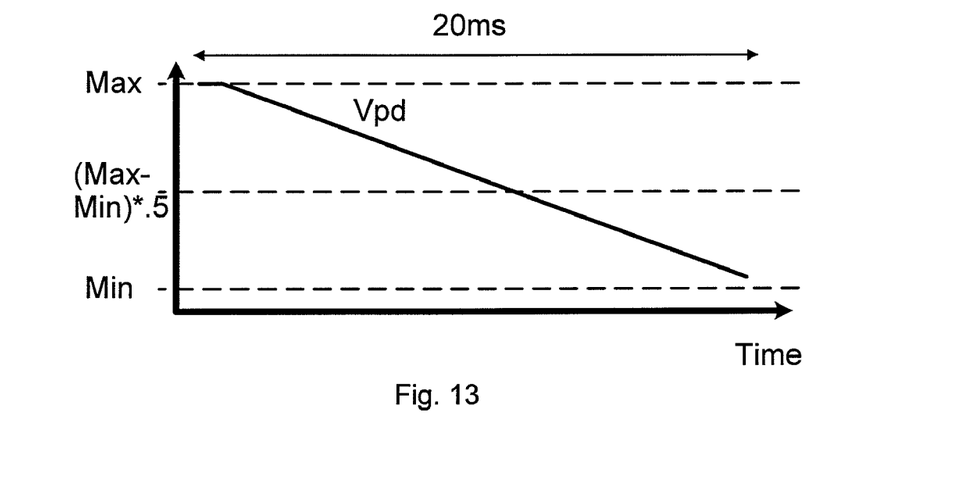
FIG. 13 illustrates a graph of voltage versus time for one 20 ms integration periods for the same light levels as FIG. 12.

FIG. 12 shows the same example as FIG. 11 but, in this case, there is less light falling on the pixel compared with that in FIG. 11. As a result of the reduced light levels, the slew rate of the pixel is lower. After the 10 ms of integration time, the voltage is less than approximately ½ the maximum swing. Accordingly, the pixel would not have saturated if a 20 ms integration period and having two 10 ms integration periods does not provide the same advantage as with higher light levels. In fact, the pixels sensitivity to light is reduced. Referring to FIG. 13, an example of the slew rate over a longer integration period for the same light levels of FIG. 12 is shown. This demonstrated the benefits of a having a longer integration period for appropriate light levels.

As such, as shown in FIG. 3, it is preferable to have an exposure monitoring circuit 18, which is typically combined in a processor control 20. The exposure monitoring circuit 18 would monitor the pixel values of the pixel array 12. If a predetermined number of pixels were registering a pixel value representing a light level below a predetermined value, then the exposure monitoring circuit would reduce the rate at which the pixel readout circuit 14 is reading pixel values. Furthermore, depending on the rate at which the pixel readout circuit 14 is operating at, it may be possible to have a staged reduction in readout rates. For example, if the pixel readout circuit 14 is operating at four times the image output circuit 16 at high light levels, the exposure monitoring circuit 18 may have predetermined pixel values for reducing the rate of the pixel readout circuit 14 to three times and then a further two predetermined pixel values for reducing to two times and eventually the same rate as the image output circuit 16.

In a similar manner, the exposure monitoring circuit 18 will also monitor the pixel values such that the rate that the pixel readout circuit 14 is operated may be increased, where light levels are increasing.

Figure 14:
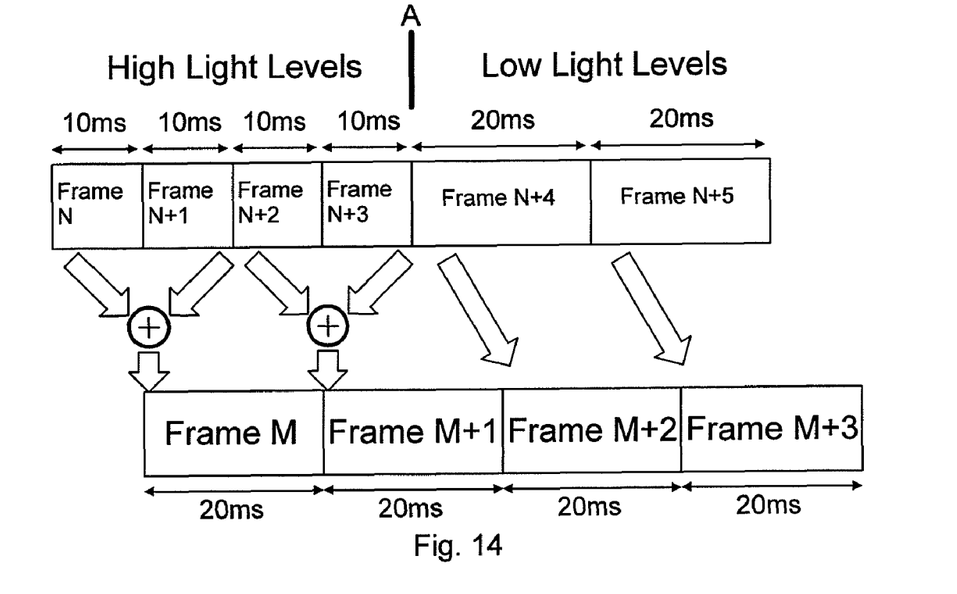
FIG. 14 illustrates first images frames from a pixel readout circuit and second image frames from an image output circuit, where the rate of the pixel readout circuit is reduced.

Referring to FIG. 14, an example of pixel readout circuit 14 initially operating at twice the rate of the image output circuit 16, in which first image frames N, N+1, N+2, . . . are frames from the pixel readout circuit 14 and second image frames M, M+1, M+2, are frames from the image output circuit 16.

In this example, the exposure monitoring circuit 18 detects at point A that the light levels of the entire pixel array, the predetermined number of pixels referred to earlier being 100% of the pixels, have reduced to below a predetermined level, which in this case is ½ the saturation level. As such, the exposure monitoring circuit 18 instructs the pixel readout circuit 14 to start operating at the same rate as the image output circuit 16, which in this case is 20 ms.

Figure 15:
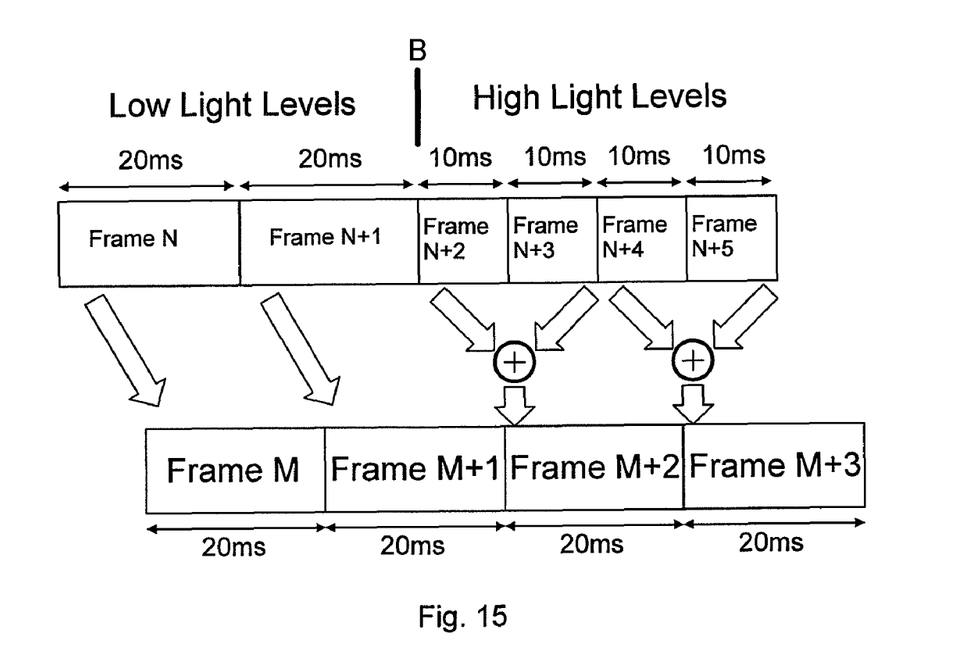
FIG. 15 illustrates first images frames from a pixel readout circuit and second image frames from an image output circuit, where the rate of the pixel readout circuit is increased.

Referring now to FIG. 15, the same example as described in FIG. 14 is shown but this time the light levels increase above the predetermined level, ½ the saturation level, at point B and the exposure monitoring circuit 18 instructs the pixel readout circuit 14 to start operating at twice the rate as the image output circuit 16, which in this case is 10 ms.

When the pixel readout circuit is operating at a slower rate than maximum, as well as increasing the integration time, the readout time is also increased. Hence, the data-rate from the pixel array is reduced. As such, it is possible to reduce the bandwidth of the image output circuit and other circuits on the device, which leads to lower power consumption and also reduction in noise. It is also possible to reduce the system's clock frequency, further reducing the power consumption and also any emitted electro-magnetic radiation (EMI/EMC) which may interfere with the rest of the system.

The choice of when the system should use a pixel readout circuit rate faster than that of the image output circuit is dependent on system design. Faster pixel readout circuit rates reduce readout noise, as described above. Pixel readout circuit rates closer to that of the image readout circuit provide: larger signal swing compared to ADC quantizing, reducing the effect of quantization noise; less power consumption and, hence, reduced power dissipation, leading to less heating and reduced temperature and therefore reduced dark current and dark current noise; and reduced data rate, which gives reduced bandwidth and, as a result, reduced noise Hence, the determination on switching between these modes is critically dependent on the system design and implementation, especially relative noise performance between the above mentioned considerations.

As such the present invention provides reduction in noise in an image, particularly photon shot noise, while retaining photo-sensitivity and also minimizing motion artifacts for certain light conditions.

Typically, modern image sensors, especially those with a high pixel count, usually are operating at the maximum readout rate and hence doubling, or further increasing, the pixel readout rate is not possible. Therefore, currently, lower resolution sensors are therefore more likely to be able to take advantage of this technique. In particular, applications requiring a lower pixel count but high performance, such as an endoscope, are suited to this invention.

However, it is commonly recognized that further increases in resolution, or pixel count, are unlikely to provide higher quality images and, as such, if processor speed continues to increase whilst resolution does not, then this technique could also be applied to high pixel count image sensors.

FIG. 3 shows one example of an implementation of the invention with a pixel array sensor block and a processing (image output circuit) block. It should be recognized that these functions may be combined and may be implemented onto a single substrate, or, alternatively, on separate substrates. These separate substrates may be in the same (camera) housing or separated, as this does not detract from the processing techniques. In addition, the frame store shown in FIG. 3, may be internal to the processing device, that is, on the same substrate, or external, composed of standard memory devices.

Switching between the rate at which the pixel readout circuit 14 operates at can, for example, be achieved by: the image output circuit 16 sending a control signal to the pixel readout circuit 14; the image output circuit 16 setting appropriate internal register in the pixel readout circuit 14 via a serial bus (for example, I2C); the image output circuit 16 changing the clock signal frequency to the pixel readout circuit 14 and associated circuitry; or by any other suitable means.

The combination of first image frames may be performed on the "raw" (that is, unprocessed) pixel values or also after image processing (e.g. Bayer to RGB) conversion.

Improvements and modifications may be incorporated without departing from the scope of the present invention.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An imaging system, comprising:
   a pixel readout circuit configured to produce a plurality of first image frames from a plurality of pixels at a first frame rate at or greater than 100 Hz, each first image frame produced from substantially fully charged pixels;
   an image output circuit configured to produce a plurality of second image frames and further configured to produce each second image frame from more than one of the first image frames at a second frame rate at or about between 50-60 Hz.

2. The imaging system as claimed in claim 1, wherein the image output circuit is configured to perform a statistical combination of more than one of the first image frames to produce each second image frame.

3. The imaging system as claimed in claim 2, wherein the statistical combination is an averaging of the respective pixel values of more than one of the first image frames.

4. The imaging system as claimed in claim 1, wherein the image output circuit is configured to produce a second image frame from one or more first image frames which have been entirely readout from the pixel readout circuit before the end of the second image frame.

5. The imaging system as claimed in claim 1, wherein a second image frame M, of the second image frames, is produced from the first image frames N−Y to N+(X−1), the first fraction 1/X of frame M being produced from frames N−Y to N−(Y+(Z−1)), where Y is the number of first image frames previous to first image frame N to be included in producing the first fraction 1/X of frame M and Z is the number of frames to included in each fraction, the subsequent fraction being produced from frames N−(Y+1) and N−(Y+Z), and the pattern continuing up to frames N+(X−Z) and N+(X−1).

6. The imaging system as claimed in claim 5, wherein X is either 2 or 4, Y is 1 and Z is either 2 or 4.

7. The imaging system as claimed in claim 1, wherein the first image frames are produced at the first frame rate which is equal to a non-integer multiple X of the second frame rate of the second image frames, and wherein the image output circuit produces second image frames from a predetermined number of first image frames which have already been produced by the pixel readout circuit.

8. The imaging system as claimed in claim 7, wherein the predetermined number of first image frames is two.

9. The imaging system according to claim 1, wherein the system is a selected one of an endoscope apparatus and a video imaging system.

10. The imaging system as claimed in claim 1, wherein the second frame rate of the image output circuit operates at one of 50 Hz and 60 Hz.

11. An imaging system, comprising:
    a pixel readout circuit configured to produce a plurality of first image frames from a plurality of pixels at a variable first image frame readout rate;
    an image output circuit configured to produce a plurality of second image frames and further configured to produce each second image frame from more than one of the first image frames,
    wherein the pixel readout circuit is configured to produce the first image frames at a rate faster than the image output circuit produces the second image frames;
    an exposure monitoring circuit configured to monitor an exposure of the plurality of pixels by receiving pixel light level values;
    wherein the pixel readout circuit is further configured to change the variable first image frame readout rate in response to the pixel light level values monitored by the exposure monitoring circuit.

12. The imaging system as claimed in claim 11, wherein the exposure monitoring circuit is configured to determine whether a predetermined number of the plurality of pixels have a pixel light level value below a predetermined light level, and wherein the pixel readout circuit is configured to reduce the variable first image frame readout rate in response thereto.

13. The imaging system as claimed in claim 11, wherein the exposure monitoring circuit is configured to determine whether a predetermined number of the plurality of pixels have a pixel light level value above a predetermined light level, and wherein the pixel readout circuit is configured to increase the variable first image frame readout rate in response thereto.

14. The imaging system as claimed in claim 11, further comprising a circuit configured to alter a pixel readout circuit clock frequency for the variable first image frame readout rate in accordance with a signal generated by the exposure monitoring circuit in response to a comparison of pixel light level values of a number of pixels to a predetermined light level.

15. An imaging system, comprising:
    a pixel readout circuit configured to produce a plurality of first image frames from a plurality of pixels;
    an image output circuit configured to produce a plurality of second image frames and further configured to produce each second image frame from more than one of the first image frames,
    wherein the pixel readout circuit is configured to produce the first frames at a rate faster than the image output circuit produces the second image frames;
    wherein the first image frames are produced at a rate equal to an integer multiple X of the rate of the second image frames, and wherein a second image frame M, of the second image frames, is produced from the first image frames N to N+(X−1) and production of frame M begins once information from frame N+1 is available.

16. The imaging system as claimed in claim 15, wherein X is 2.

17. The imaging system as claimed in claim 16, wherein a second image frame M, of the second image frames, is produced from the first image frames N and N+1 and production of frame M begins once information from frame N+1 is available.

18. A method, comprising:
reading out a plurality of first image frames from a plurality of pixels at a first frame rate at or greater than 100 Hz, each first image frame produced from substantially fully charged pixels;
producing a plurality of second image frames wherein each second image frame is produced from more than one of the first image frames at a second frame rate at or about between 50-60 Hz.

19. The method as claimed in claim 18, wherein producing a plurality of second image frames comprises performing a statistical combination of more than one of the first image frames to produce each second image frame.

20. The method as claimed in claim 18, wherein a second image frame M, of the second image frames, is produced from the first image frames N−Y to N+(X−1), the first fraction 1/X of frame M being produced from frames N−Y to N−(Y+(Z−1)), where Y is the number of first image frames previous to first image frame N to be included in producing the first fraction 1/X of frame M and Z is the number of frames to included in each fraction, the subsequent fraction being produced from frames N−(Y+1) and N−(Y+Z), and the pattern continuing up to frames N+(X−Z) and N+(X−1).

21. A method, comprising:
reading out a plurality of first image frames from a plurality of pixels;
producing a plurality of second image frames wherein each second image frame is produced from more than one of the first image frames;
wherein reading out comprises producing the first image frames at a rate faster than the second image frames are produced;
monitoring an exposure of the plurality of pixels by receiving pixel light level values;
determining if a predetermined number of pixels have a pixel light level value above or below a predetermined level; and
adjusting a rate at which the first image frames are produced in response to the determination.

22. A method, comprising:
reading out a plurality of first image frames from a plurality of pixels;
producing a plurality of second image frames wherein each second image frame is produced from more than one of the first image frames; and
wherein reading out comprises producing the first image frames at a rate faster than the second image frames are produced;
wherein the first image frames are produced at a rate equal to a multiple X of the rate of the second image frames, and wherein a second image frame M, of the second image frames, is produced from the first image frames N to N+(X−1) and production of frame M begins once information from frame N+1 is available.

* * * * *

UNITED STATES PATENT AND TRADEMARK OFFICE
CERTIFICATE OF CORRECTION

| | | |
|---|---|---|
| PATENT NO. | : 8,279,306 B2 | Page 1 of 1 |
| APPLICATION NO. | : 11/966001 | |
| DATED | : October 2, 2012 | |
| INVENTOR(S) | : Jeffrey M. Raynor | |

It is certified that error appears in the above-identified patent and that said Letters Patent is hereby corrected as shown below:

At column 2, line number 24, please replace the word [resealed] with -- rescaled --.

Signed and Sealed this
Fourth Day of December, 2012

David J. Kappos
*Director of the United States Patent and Trademark Office*